United States Patent [19]

Ozawa

[11] Patent Number: 4,810,181
[45] Date of Patent: Mar. 7, 1989

[54] INJECTION MOLDING APPARATUS WITH ALTERNATELY MOVED METAL MOLDS

[75] Inventor: Koichi Ozawa, Numazu, Japan

[73] Assignee: Toshiba Kikai Kabushiki Kaisha, Tokyo, Japan

[21] Appl. No.: 64,209

[22] Filed: Jun. 19, 1987

[30] Foreign Application Priority Data

Jun. 19, 1986 [JP] Japan ................................ 61-143593

[51] Int. Cl.⁴ ............................................ B29C 45/10
[52] U.S. Cl. .................................. 425/190; 264/297.2; 425/451; 425/574; 425/575; 425/589; 425/595
[58] Field of Search .................... 264/297.2, 297.3; 425/539, 541, 572, 574, 575, 589, 595, 450.1, 451, DIG. 221, 190

[56] References Cited

U.S. PATENT DOCUMENTS

| | | | |
|---|---|---|---|
| 3,982,869 | 9/1976 | Eggers | 425/575 |
| 4,518,344 | 5/1985 | Latreille et al. | 425/572 |
| 4,555,228 | 11/1985 | Nishiike et al. | 425/190 |
| 4,594,067 | 6/1986 | Langos | 425/DIG. 221 |

FOREIGN PATENT DOCUMENTS 1228490 4/1960 France ................................ 425/575

Primary Examiner—Jay H. Woo
Assistant Examiner—Timothy W. Heitbrink
Attorney, Agent, or Firm—Koda and Androllia

[57] ABSTRACT

An injection molding machine is provided with two sets of metal molds each including a stationary and movable metal molds. The two sets are mounted on a supporting plate which is moved in a direction perpendicular to the axis of an injection cylinder. Thus by reciprocating the supporting plate the two sets of the metal molds are alternately moved into and out of the injection molding machine.

3 Claims, 4 Drawing Sheets

INJECTION MOLDING APPARATUS WITH ALTERNATELY MOVED METAL MOLDS

BACKGROUND OF THE INVENTION

This invention relates to an injection molding machine utilized to form plastic molded products.

A horizontal type molding machine is generally constructed such that metal mold halves are mounted on a stationary die plate and a movable die plate respectively, that the movable die plate is moved toward the stationary die plate and the mold halves are clamped together, that a molten resin is injected into a cavity formed in the clamped mold halves and that a molded product is taken out of the cavity after cooling.

Recently, a high productivity of twice or more of the prior art has been requested for the injection molding machine.

However, in the prior art injection molding machine the molten resin is injected into the mold cavity as above described, and the molded product is taken out of the cavity after the molded product has been cooled and perfectly solidified. This requires a long waiting time and a long time per one operating cycle so that the prior art machine cannot satisfy the desired high efficiency and high productivity.

SUMMARY OF THE INVENTION

It is an object of this invention to provide a novel injection molding machine capable of eliminating the waiting time for cooling the metal mold, thereby attaining high operating efficiency and high productivity.

Another object of this invention is to provide an improved injection molding machine capable of availing sufficient metering time for the resin being injected, thus giving a high performance to a small injection molding machine.

Still another object of this invention is to provide an improved injection molding machine, thus reducing the time of exchanging the metal mold and facilitating mounting the same.

A further object of this invention is to provide an injection molding machine provided with two sets of metal molds which are alternately moved into and out of the injection molding machine, thus providing various advantages described above.

According to this invention there is provided an injection molding machine of the type having a stationary metal mold, a movable metal mold, and mold clamping means for clamping together the stationary and movable metal molds for injecting molten material from an injection cylinder into a cavity formed in clamped stationary and movable metal molds, characterized by comprising two sets of metal molds each including a stationary metal mold and a movable metal mold, a metal mold supporting plate mounted with the two sets of metal molds at respective predetermined positions, and means for reciprocating the metal mold supporting plate in a direction perpendicular to an axis of the injection cylinder for alternately setting the two sets of metal molds into the injection molding machine.

DESCRIPTION OF THE PREFERRED EMBODIMENT

The invention will now be described in detail with reference to the accompanying drawings.

Figure 1:
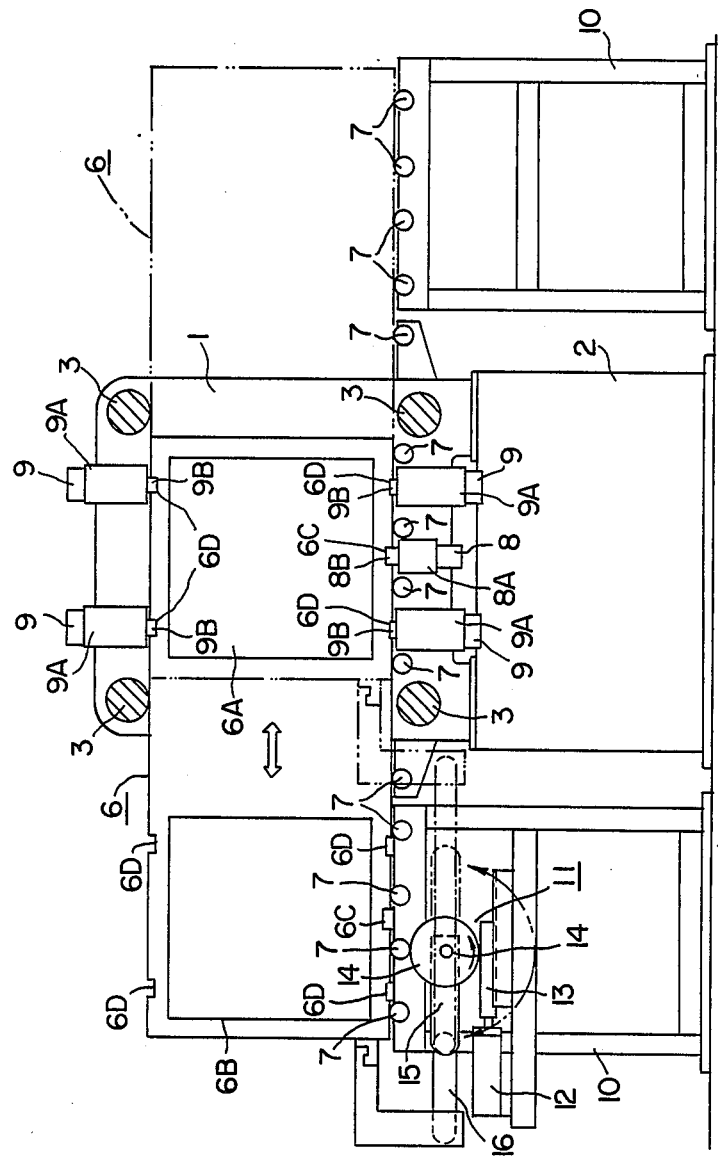
FIG. 1 is a side view of a horizontal type injection molding machine embodying this invention and shows a sectional view taken along the mating surface of the stationary and movable metal molds and viewed in the direction of the stationary metal mold.

The horizontal injection molding machine shown in FIG. 1 comprises a stationary die plate 1 mounted on a support 2 and connected to a mold clamping cylinder, not shown, through four tie bars 3. A movable die plate 4 shown in FIG. 4, but not shown in FIG. 1, is movably mounted on the tie bars 3. The movable die plate 4 is moved toward and away from the stationary die plate 1 by a piston rod (mold clamping ram 5) of the mold clamping cylinder. A mold supporting plate 6 is provided along the surface of the stationary die plate 1 and between upper and lower tie bars. The mold supporting plate 6 takes the form of an elongated rectangle having two square marks 6A and 6B showing the positions of securing metal molds 17 and 19 and is movably supported by a guide means located beneath stationary die plate 1. In the illustrated embodiment the guide means comprises a series of flanged rollers 7 arranged in the horizontal direction beneath the stationary die plate 1 so as to support the lower edge of the mold supporting plate 6 to guide it in the horizontal direction.

Positioning means 8 for positioning the mold supporting plate 6 at a prescribed position(center) is disposed below the stationary die plate 1, and mold clamping devices 9 for securing the mold supporting plate 6 to the stationary die plate 1 are provided at the upper and lower portions of the stationary die plate 1. The positioning means 8 and the clamping devices 9 are constructed such that the piston rods 8B and 9B of cylinders 8A and 9A are fitted into recesses 6C and 6D of the mold supporting plate 6. Alternatively, the positioning and clamping can be effected manually.

Since in a large injection molding machine, the weight of the metal mold is large and the lateral width of the mold supporting plate 6 is also large, in this embodiment auxiliary supports 10 are provided on both sides of the stationary die plate 1 and flanged rollers 7 acting as guide means are also mounted on the auxiliary supports 10. Thus when the mold supporting plate 6 is moved to the left or right, about one half length of the mold supporting plate 6 would be supported by the auxiliary support 10.

A drive means 11 for moving the mold supporting plate 6 is mounted on one of the auxiliary supports 10. As shown in FIG. 1, the drive means 11 comprises a rack 13 reciprocated by an oil pressure cylinder 12, a pinion 14 meshing with rack 13 and journalled by the auxiliary support 10, a first arm 15 secured to the shaft 14A of pinion 14, and a second arm 16 pivotably supported by the front end of the first arm 15. The front end of the second arm 16 is connected to mold supporting plate 6 so as to reciprocate rack 13 to rotate pinion 14. As a consequence, the first arm 15 is swung to push and pull the second arm 16 for moving the mold supporting plate 6 by predetermined amount. It should be understood that the driving means 11 is not limited to the construction described above and that any other construction can be used. For example, a construction wherein an oil pressure cylinder of a long stroke is used for push and pull the mold supporting plate 6, and a construction wherein an electric motor is used for driving the mold supporting plate through a gear train or the like may be used.

Figure 2:
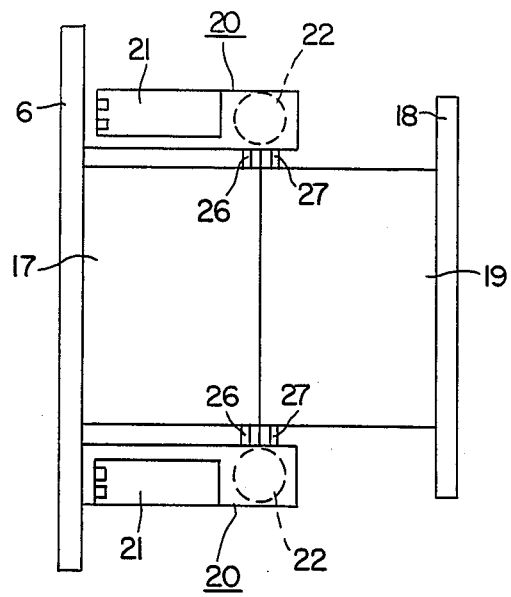
FIG. 2 is a plan view showing one example of a metal mold locking means.

As shown in FIG. 2, locking means 20 for locking and unlocking metal molds 17 and 19 are provided on the opposite sides of a mating portion of the stationary metal mold 17 mounted on the mold supporting plate 6 and the movable mold 10 mounted on the mold supporting plate 18.

Figure 3:
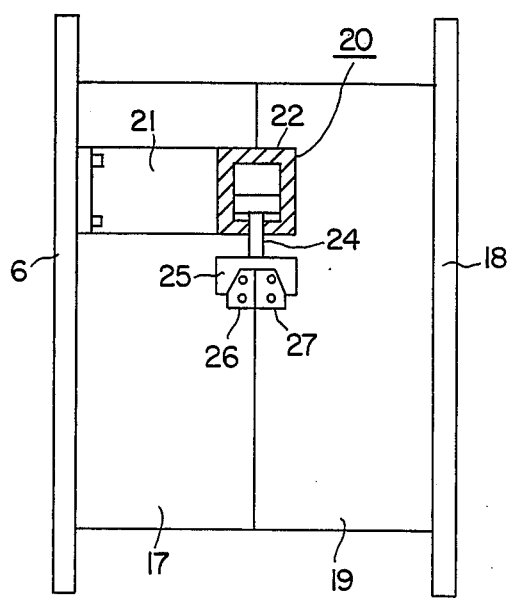
FIG. 3 is a side view partly in section showing the metal mold locking meas.

As shown in FIGS. 2 and 3, each locking means 20 comprises an oil pressure cylinder 22 secured to the mold supporting plate 6 via a bracket 21, a locking member 25 having inner tapered surfaces and connected to the piston rod 24 of the oil pressure cylinder 22, a stationary tapered member 26 and a movable tapered member 27 respectively having tapered surfaces engaged by the tapered surfaces of locking member 25, the tapered members 26 and 27 being secured to the metal molds 17 and 19 respectively on both sides of the mating surface of the metal molds 17 and 19. After mating together the stationary and the movable metal molds 17 and 19, the oil pressure cylinder 22 is actuated for clamping together the tapered members 26 and 27 with the tapered member 25 so as to lock the metal molds 17 and 19 in a closed state.

The operation of the embodiment will be described with reference to FIG. 4A through FIG. 4J in which 28 shows an injection nozzle, X and Y show two sets of metal molds and elements corresponding to those shown in FIG. 1 are designated by the same reference numerals.

Figure 4A:
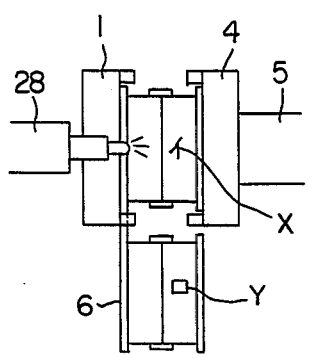
FIGS. 4A through 4J are side views showing successive operating steps of the metal molds.

First Step (FIG. 4A)

A cooling step following the molding operation is started under a condition in which one of the metal molds Y is closed by the mold clamping means 9 while the other metal mold X is set in the injection molding machine so that injection molding is made while the metal molds are clamped together. At this time the mold clamping device 9 in the injection molding mechanism is released.

Figure 4B:
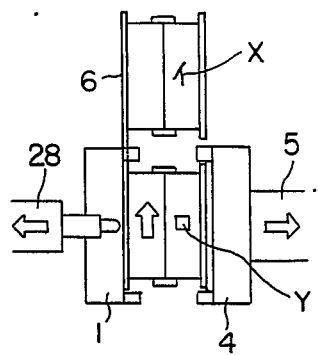

Second Step (FIG. 4B)

Upon completion of the injection into the metal mold X, nozzle 28 is retracted and the movable die plate 4 is retracted to the right by about 10 mm. Then the mold supporting plate 6 is moved upwardly by drive means 11 and the metal mold X enters into the cooling step.

Figure 4C:
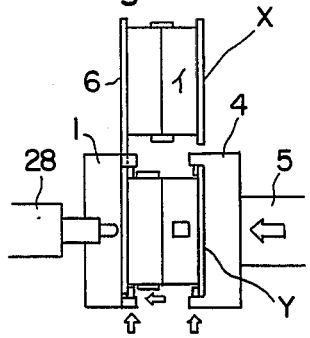

Third Step (FIG. 4C)

The movable metal mold 19 of mold Y is brought into direct contact with the movable die plate 4 by advancing the mold clamping ram 5. Then the mold clamping device 9 is operated while the mold locking means is released.

Figure 4D:
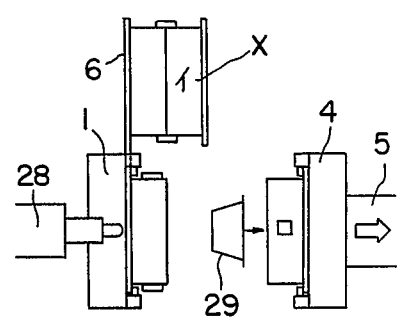

Fourth Step (FIG. 4D)

The mold clamping ram 5 is retracted further for opening the mold so as to take out the molded product 29 in the metal mold Y.

Figure 4E:
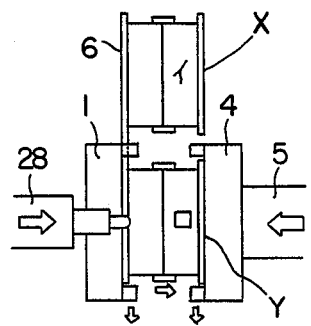

Fifth Step (FIG. 4E)

After taking out the molded product 29, the mold clamping ram 5 is advanced again for clamping together the metal molds. Then nozzle 28 is advanced for effecting a nozzle touch operation and the mold locking means 20 is operated to lock the metal mold Y. Thereafter the mold clamping device 9 is released.

Figure 4F:
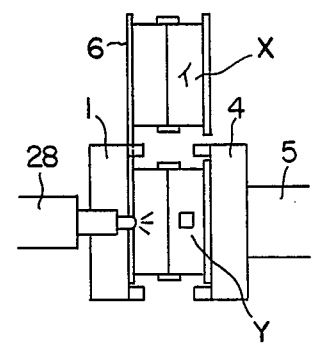

Sixth Step (FIG. 4F)

A thermoplastic resin is injected into the metal mold Y.

Figure 4G:
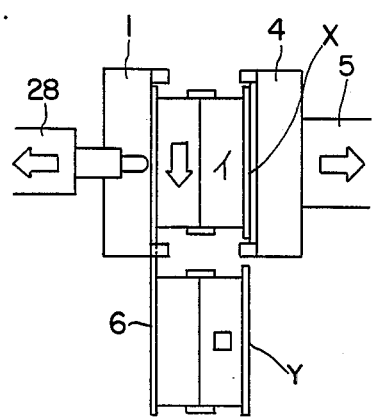

Seventh Step (FIG. 4G)

The nozzle 28 is retracted and the mold clamping ram 5 is also retracted by about 10 mm for opening the mold. The mold supporting plate 6 is moved downwardly by drive means 11. Then the metal mold Y enters into the cooling step, while the metal mold X is being set in the injection molding machine.

Figure 4H:
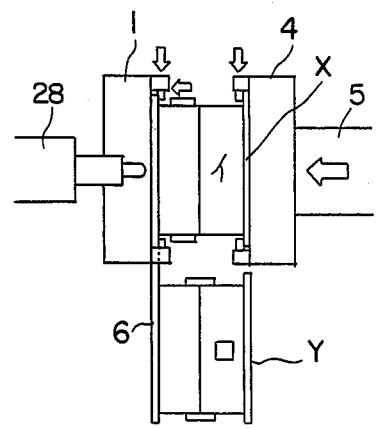

Eighth Step (FIG. 4H)

The mold clamping ram 5 is advanced to close the mold. The mold clamping device 9 is actuated under this state and the mold locking means 20 is released.

Figure 4I:
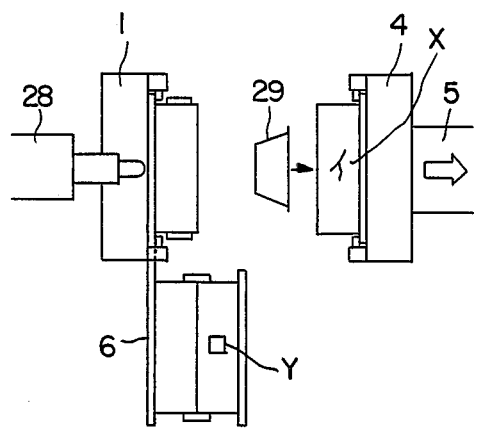

Ninth Step (FIG. 4I)

The mold clamping ram 5 is retracted further for opening the mold thereby to take out the molded product 29.

Figure 4J:
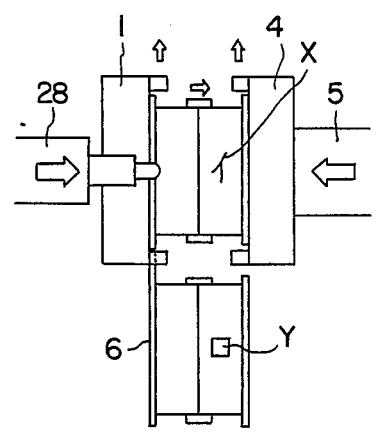

Tenth Step (FIG. 4J)

The metal mold X is closed together, the mold clamping device 9 is released and the mold locking means 20 is operated.

Then the step is returned to the first step (FIG. 4A), thereby completing one cycle of operations. Thereafter the cycle is repeated thereby enabling molding by using two sets of metal molds X and Y.

Although in the foregoing embodiment a horizontal type injection molding machine was described, the invention can also be applied to a vertical type injection molding machine. The auxiliary supports 10 on the opposite sides may be omitted where the injection molding machine is small. Furthermore the mold clamping device on the side of the movable die plate is not always necessary to produce a clamping force but may be a simple support for preventing the metal mold from dropping. Where an oil pressure circuit is used which opens and closes the mold during metering of the resin, the operating speed of the machine can be increased.

As above described, according to this invention even when the molding product requires a cooling time it is possible to reduce the cycle time to one half and to make easy the setting of the mold in the molding machine for products requiring cooling. Moreover a sufficient metering time can be available before the next injection operation. Even a small injection molding machine can exhibit a high performance, thus reducing the manufacturing cost. Since a metal mold set to be used next has already been mounted on the metal mold supporting plate, exchange of the metal mold can readily be made in a short time. Since the metal mold supporting plate is constructed to slide along a stationary die plate, not only the movement of the metal mold is easy but also the drive means of the metal mold can be simplified, and positioning of the metal mold to a prescribed position by positioning means is also facilitated.

What is claimed is:

1. In an injection molding machine of the type having two sets of metal molds each including a stationary metal mold half and a movable metal mold half, and mold clamping means for clamping together the stationary and movable metal mold halves for injecting molten material from an injection cylinder into a cavity formed by said stationary and movable metal mold halves, the improvement comprising:

a metal mold supporting plate which supports said stationary metal mold halves and said movable mold halves of said two sets of metal molds at positions based in a direction perpendicular to an axis of said injection cylinder;

means for reciprocating said metal mold supporting plate in a direction perpendicular to the axis of said injection cylinder for alternately setting said two sets of metal molds into said injection molding machine;

said reciprocating means including an auxiliary support separate from a support for supporting said injection molding machine, a drive member mounted on said auxiliary support, a pinion driven by said drive member and journalled by said auxiliary support and arm means for transmitting movement of a shaft of said pinion to said supporting plate;

means for moving one of said movable metal mold halves toward and away from one of said stationary metal mold halves which is held at a position at which said molten resin is injected into said mold cavity; and positioning means for positioning said metal mold supporting plate at a prescribed position, said positioning means being disposed below one of said stationary die plates which is set into said injection molding machine; and wherein said mold clamping means further secures said mold supporting plate and wherein each of said positioning means and said mold clamping means includes recesses formed in said mold clamping plate and a piston rod moves into and out of said recesses.

2. The injection molding machine according to claim 1 further comprising auxiliary supports on both sides of said support, each auxiliary support being provided with rollers for guiding said metal mold supporting plate.

3. The injection molding machine according to claim 1 further comprising an oil pressure actuator secured to said metal mold supporting plate and a locking member actuated by said oil pressure actuator for locking the stationary and movable metal molds of each set in a closed state.

* * * * *